Feb. 28, 1950     B. E. ROETHELI     2,498,710
PROCESS FOR BURNING LIME

Filed Jan. 1, 1943     2 Sheets-Sheet 1

Bruno E. Roetheli Inventor
By P. A. Young Attorney

Patented Feb. 28, 1950

2,498,710

UNITED STATES PATENT OFFICE 2,498,710

PROCESS FOR BURNING LIME

Bruno E. Roetheli, Cranford, N. J., assignor to Standard Oil Development Company, a corporation of Delaware Application January 1, 1943, Serial No. 471,073

8 Claims. (Cl. 263—53)

This invention relates to improvements in the burning of lime and relates particularly to improvements in controlling the conditions while burning lime.

Lime is pure calcium oxide but generally consists of calcium oxide together with impurities such as magnesium oxide. Limestone that is substantially pure calcium carbonate is generally preferred as the basic material from which lime is prepared as high calcium limes are stronger for building purposes than those containing a considerable percentage of magnesium. They are also better suited for mortar work as they slake more readily. Limestones containing magnesia may, however, be advantageously used as a source of magnesium by suitable separation following calcination.

An advantage of limes containing high percentages of magnesia is that this particular lime finishes better and is more readily smoothed out under the trowel. Lime is rarely snow-white as it generally contains a certain amount of impurities that impart to it a gray or yellow color. These impurities are chiefly iron and manganese also in certain methods of burning the ash of the fuel used in making a lime causes discoloration. The amount of heat required in calcining lime to drive off its carbon dioxide is theoretically 806 gram-calories per gram of calcium oxide and 733 gram-calories per gram of magnesium oxide. Therefore dolomitic lime stones require less fuel than high calcium lime stones. The temperature at which calcium carbonate decomposes is 898° C. at atmospheric pressure while magnesium carbonate decomposes at 575° C. at atmospheric pressure. Lime kilns are ordinarily operated at from 900° to 1100° C. in the burning zone. Where temperatures above 1200° C. are employed in the burning zone, the lime will be partially vitrified on the outside of the lumps due to the combination of the calcium oxide with impurities ($SiO_2$ and $Al_2O_3$) always present in small quantities even in the purest limestone. The effect of these impurities is that the finished lime is very slow in slaking and some of it may escape hydration in the mortar box and later will expand forming blisters in the finished work.

The various methods heretofore used for preparing lime were first, in using intermittent kilns in which the kiln was first charged with limestone lumps of 2 to 8 inches in diameter, after which a fire, usually of wood, was started underneath the kiln and the temperature raised gradually. Generally, at the end of about 6 or 8 hours the desired temperature was obtained and the kiln was kept at this temperature for about two days after which the limestone was allowed to cool and removed from the kiln. There are various continuous kilns used, (1) in which a mixed feed of limestone and fuel are charged in alternate layers, (2) the vertical kiln with separate feed in which the limestone and fuel are not brought in contact and, (3) a rotary kiln.

Where the rotary kiln is used the limestone is first crushed to obtain pieces ranging from 2½ inches down to dust and fed into the kiln which is heated by producer gas, oil or powdered coal. Rotary kilns are now generally employed for burning building lime where outputs greater than 100 tons per day are required. In these various methods of making lime it has generally been found that for each ton of good bituminous coal burned, only 4½ tons of lime could be prepared.

One object of this invention is to form a continuous process in which the limestone may be more quickly reduced to calcium oxide with less expenditure of fuel.

Another object is to operate at the temperature best suited for calcination of limestones or dolomite.

Another object is to selectively calcine magnesium carbonate so as to facilitate separation of magnesium salts by solvent extracting the selectively calcined material, as by ammonia.

Another object is to prepare a lime free of ashes.

Another object is to prepare a $CO_2$ rich gas that may be used commercially for the preparation of dry ice, etc.

These and other objects of the invention will be more readily understood on reading the following process with reference to the accompanying drawings.

Figure 1:
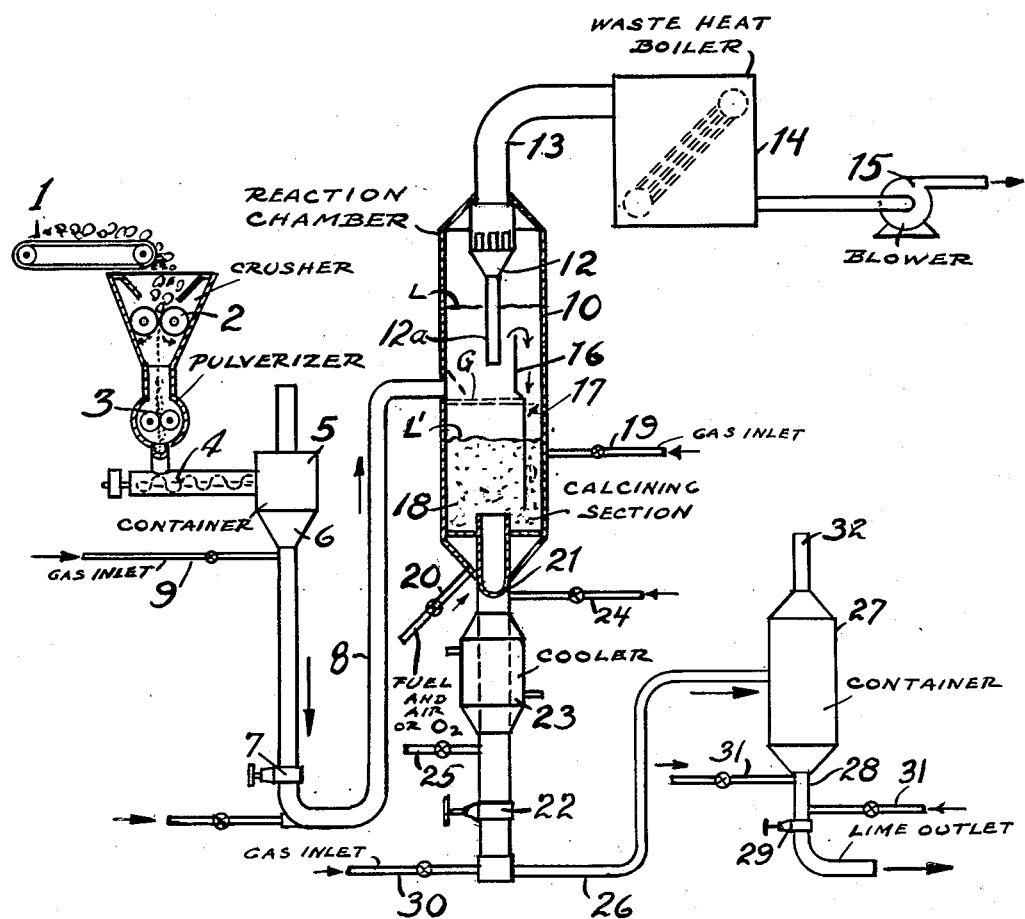
Fig. 1 is one arrangement of apparatus showing the flow of material.
Figure 2:
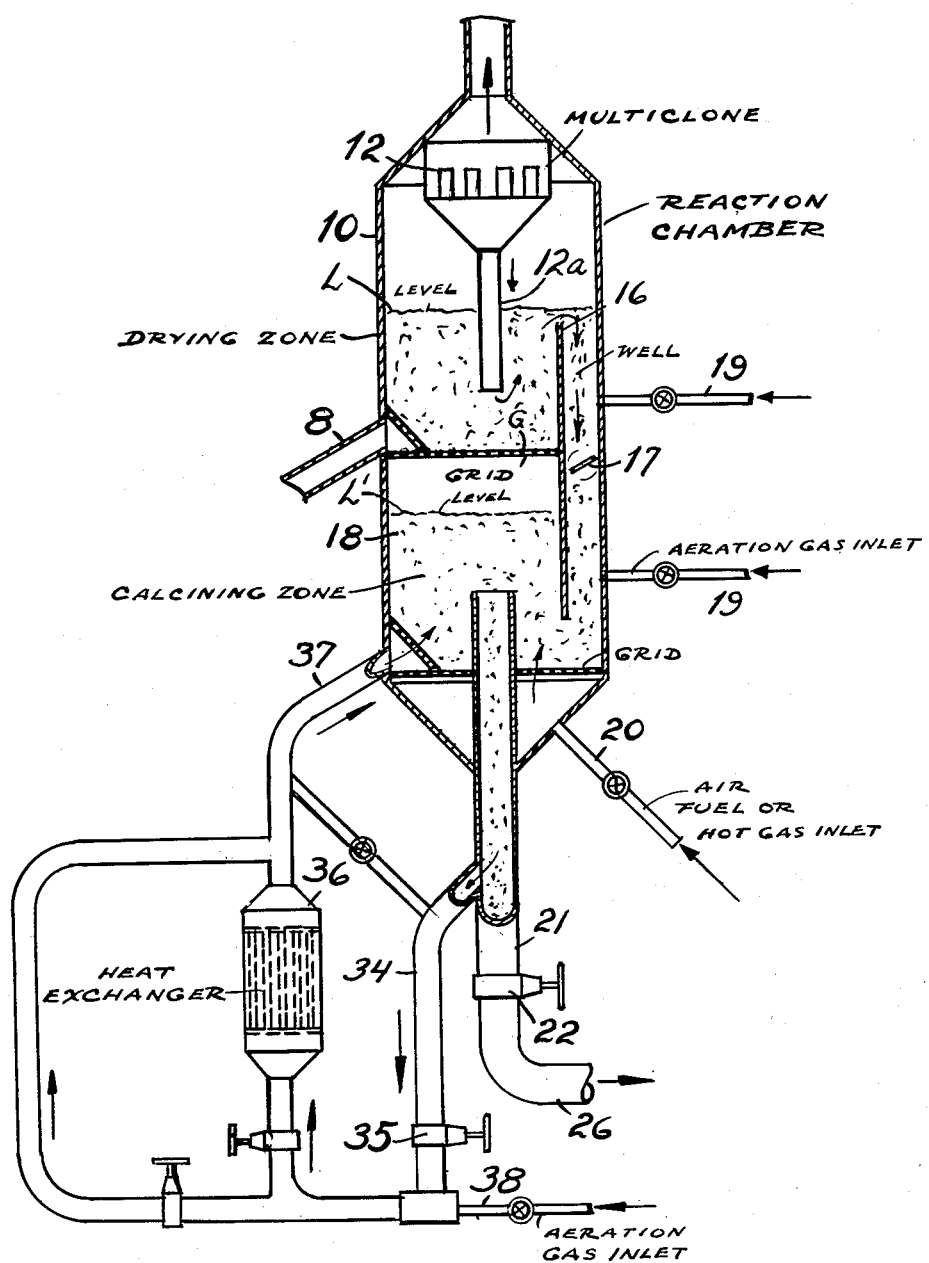
Fig. 2 is a sectional view of part of another embodiment of apparatus suitable to carry out the invention.

Referring to the drawings, limestone is brought on a suitable conveyor designated by the numeral 1 and herein shown as an endless belt and passed into a crusher 2 where the size of the limestone is reduced to about 1 inch in diameter, after which it is passed to a pulverizer 3 and reduced so that practically all will pass through a 100 mesh screen. This pulverized limestone is then passed by means of screw conveyor 4 or other suitable conveying means into a container 5. The container 5 empties into pipe 6 provided with a gate valve 7 which is used to regulate the amount of the pulverized limestone passing into pipe 8. Into pipe 6 is introduced a gas such as flue gas, air or any other inert gas by means of pipe 9. Any aeration gas may be used but it is generally preferred to use a flue gas in order to obtain a gas rich in $CO_2$. This gas fluidizes the pulverized limestone and the fluidized pulverized limestone is conveyed through pipes 6 and 8 into reaction chamber 10.

The finely divided pulverized limestone is fluidized in pipe 6 by blowing a gas through the powder at the rate of the order of at least 0.01 to 0.05 cubic foot per pound of powder. The fluidized powder behaves like a liquid and has many of the hydraulic properties of a liquid in that 1. It flows through pipes under the influence of an unbalanced force such as gravity, differential pressures, etc.
2. It tends to assume the shape of the container.
3. It flows through conduits or pipes accompanied by a pressure drop.
4. Gas seals can be produced in the same manner as a liquid is used to seal a gas holder.
5. The fluidized powder assumes an upper phase boundary "level" in a container when a constant supply of aeration gas is furnished at certain specific rates of flow.

Although the lime evolves gas via decomposition, sufficient inert gas or recycled product gas must be supplied to maintain a fluidized state.

The fluidized pulverized limestone is preferably introduced in the upper part of reaction chamber 10 below the controlled level L of the fluidized pulverized limestone and above grid G where it is first dried by means of the hot spent gases from the lower sections. These gases are removed through pipe 13 from the reaction chamber after contacting with the cyclone separator 12 where the gases and finely divided pulverized limestone are substantially separated solids fines being returned to the upper part of reaction chamber 10 through pipe 12a. These spent gases may be used to supply heat to a waste heat boiler 14 before they are finally removed from the system by means of blower 15. The fluidized pulverized limestone, as it is being dried, continuously flows by gravity over the baffle 16 provided with butterfly valve 17 which may be manually or mechanically controlled and passes to the lower part or calcining section 18 of the reaction chamber 10 and where fuel, such as fuel oil or powdered coal, together with air or oxygen is supplied to the lower part of calcining section 18 of the reaction chamber 10 by means of pipe 20. A fluidizing gas may be introduced through line 19 to facilitate the downward flow of solids through the channel defined by baffle 16 and the wall of chamber 10. The products of combustion of the fuel and oxygen on contacting the pulverized limestone raises the temperature to the desired height, 900° to 1100° C., to drive off the carbon dioxide. The lime is retained in the calcining section 18 until the $CO_2$ content is substantially all expelled. In the fluidized solids bed having an upper level L a uniform temperature is maintained as the turbulence is so great that there is no significant temperature gradient existing.

Good mixing of the lime in the fluidized state is obtained with resulting good yields of the finished product but when extreme purity of the finished lime is desired, the process is preferably conducted in stages, that is, in the above cited example two or more reactors or reactor stages may be provided. The time of residence or time of reaction is controlled by the rate of withdrawal of the solid by means of valve 22 and rate of recycle of the lime through pipes 34 and 37 as hereinafter described.

Residence time in each of the stages may be varied within reasonable limits by

1. Recycling a portion of the lime passing from one stage to another stage back to the previous stage (when more than two calcining stages are used).
2. The use of a number of sections of varying diameters.
3. The use of stage sections of varying depth.

For chemical products of extreme purity (in view of inherent contamination with feed) one expedient for complete purification would be to finish the decomposition, in a belt, screw or Redler type conveyor following withdrawal from the fluidized solids vessel. For materials such as lime, however, this would be an extreme refinement since these materials are usually mixed with inert materials when used.

The height of the fluidized limestone in the top section of reactor 10 is used to supply the head necessary to maintain flow through valve 17. Similarly, the height of the fluidized material in the bottom section is used to supply the head required to force the material through valves 22 and 35 etc. The fluidized pulverized solid material after being decomposed to lime, then passes downwardly from the reaction chamber 10 through outlet duct 21 provided with gate valve 22 and cooler 23. Gases may likewise be introduced into this outlet duct 21 by means of pipes 24 and 25 to aid the flow of the finished lime as it passes to the bottom of the outlet duct 21 where a screw or other type of conveyor such as gas supply 30 is provided to pass the lime through pipe 26 into the container 27 from which the finished lime is removed by means of pipe 28 provided with gate valve 29, for packaging. Dry gas may be introduced by means of pipes 31 to keep the finished lime in a fluid state as it flows from the container 27. A bag filter (not shown) is provided at the top of the container 27 to separate the finished lime from the gases being expelled through pipe 32.

Alternately the reaction chamber 10 may be provided with heat exchanger 36 through which a portion of the lime passing through pipe 21 is passed by means of pipe 34 provided with a gate valve 35 to heat exchanger 36 and returned to reaction chamber 10 by means of pipe 37. An aeration pipe 38 is provided to supply a gas which keeps the lime in a fluid state and aids the flow of terials.

I claim:

1. In the production of lime, the improvements which comprise introducing a mixture of finely divided lime-forming material and gas into a reaction zone, the gas velocity being maintained at a rate sufficient to form a fluidized mass of the finely divided, lime-forming material and forming a level within said reaction zone, the space above the level being filled with a suspension having a relatively low concentration of solid particles in gas or vapor, and adding sufficient gas at an elevated temperature so that a temperature ranging from 900 to 1100° C. is maintained in the reaction zone and maintaining the level within said reaction zone at the desired level by controlling the amount of gases and solid particles withdrawn from the said reaction zone.

2. In the production of lime, the improvements which comprise introducing a suspension of finely divided lime-forming material with sufficient vapors to form a fluidized mass behaving like a liquid and forming an upper phase boundary level in a reaction zone, continuously withdrawing a fraction of the fluidized mass to a second reaction zone where a temperature ranging from 900° to 1100° C. is maintained and continuously withdrawing lime from said second reaction zone.

3. In the production of lime, the improvements which comprise conducting the calcination of a finely divided lime-forming material in a calcination zone while in the form of a dense solids bed fluidized by an aeration gas and passing through said fluidized bed of ground lime-forming material a gas at such a rate of flow as to maintain an upper phase boundary level of fluidized material and a turbulence sufficiently great to afford a substantially uniform temperature throughout said calcination zone.

4. In the production of lime, the improvements which comprise, fluidizing a finely divided lime-forming material passing practically completely through a 100 mesh sieve by adding sufficient gas in order that the fluidized material behaves like a liquid, subjecting the fluidized material in a drying zone in the form of a fluidized solids bed behaving like a liquid and forming an upper phase boundary level in said drying zone to a temperature sufficient to drive off the moisture and subjecting the material in a similarly fluidized condition in a calcination zone to a higher temperature sufficient to drive off carbone dioxide.

5. An apparatus for the production of lime from materials containing calcium carbonate which comprises a vertical reaction chamber; a perforated bottom for said reaction chamber; a horizontal grid in said recation chamber dividing said chamber into an upper and lower reaction zone while leaving an open space of substantial cross section in its horizontal plane; a vertical baffle within said open space said vertical baffle having a cross section so as to fit snugly into said open space and extending over a substantial length into said upper and lower reaction zones without reaching the upper and lower end of said vertical reaction chamber, to form a vertical open path leading from said upper to said lower recation zone; means adapted to admit fluidized finely divided, lime-forming material to said upper reaction zone; means adapted to admit a fuel gas and an oxidizing gas into said lower reaction zone, means adapted to admit a gas into said vertical path; means adapted to withdraw gas upwardly from an upper portion of said upper reaction zone; and means adapted to withdraw fluidized lime downwardly from said lower reaction zone.

6. An apparatus according to claim 5 wherein an adjustable valve is arranged within said vertical path, adapted to control the flow of fluidized solid material through said vertical path.

7. An apparatus according to claim 5 wherein means adapted to separate gas from solid particles suspended therein and means for returning solid particles thus separated to said upper reaction zone are arranged in the path of the gas withdrawn from said upper reaction zone.

8. An apparatus according to claim 5 wherein heat exchange means are connected with said means for withdrawing fluidized lime, said heat exchange means being adapted to control the temperature of and to recycle, fluidized lime withdrawn from said reaction chamber.

BRUNO E. ROETHELI.

REFERENCES CITED

The following references are of record in the file of this patent:

UNITED STATES PATENTS

| Number | Name | Date |
|---|---|---|
| 920,336 | Hughes | May 4, 1909 |
| 1,310,455 | Tainton | July 22, 1919 |
| 1,400,443 | King et al. | Dec. 13, 1921 |
| 1,625,853 | Heyl | Apr. 26, 1927 |
| 1,893,913 | Saint-Jacques | Jan. 10, 1933 |
| 2,080,883 | Wood | May 18, 1937 |
| 2,300,042 | Caldwell | Oct. 27, 1942 |
| 2,367,351 | Hemminger | Jan. 16, 1945 |
| 2,382,382 | Carlsmith | Aug. 14, 1945 |
| 2,409,707 | Roetheli | Oct. 22, 1946 |